United States Patent
Patton et al.

(10) Patent No.: US 10,108,982 B2
(45) Date of Patent: Oct. 23, 2018

(54) SYSTEMS AND METHODS FOR ACCESSING FIRST PARTY COOKIES

(71) Applicant: AOL Advertising Inc., New York, NY (US)

(72) Inventors: Matthew M. Patton, Baltimore, MD (US); Seth Demsey, Dulles, VA (US)

(73) Assignee: OATH (AMERICAS) INC., New York, NY (US)

( * ) Notice: Subject to any disclaimer, the term of this patent is extended or adjusted under 35 U.S.C. 154(b) by 710 days.

(21) Appl. No.: 13/777,914

(22) Filed: Feb. 26, 2013

(65) Prior Publication Data

US 2014/0244387 A1 Aug. 28, 2014

(51) Int. Cl.
*G06Q 30/02* (2012.01)
*G06F 17/30* (2006.01)

(52) U.S. Cl.
CPC ... *G06Q 30/0255* (2013.01); *G06F 17/30899* (2013.01); *G06Q 30/0269* (2013.01); *G06Q 30/0277* (2013.01)

(58) Field of Classification Search
CPC .................................................. G06Q 30/0251
See application file for complete search history.

(56) References Cited

U.S. PATENT DOCUMENTS

| | | | |
|---|---|---|---|
| 2006/0282327 A1* | 12/2006 | Neal | G06Q 30/02 705/14.53 |
| 2009/0024737 A1* | 1/2009 | Goldspink | G06F 11/3495 709/224 |
| 2010/0064234 A1* | 3/2010 | Schreiber | G06F 9/454 715/760 |
| 2010/0299434 A1* | 11/2010 | Hanson | G06Q 30/02 709/224 |

OTHER PUBLICATIONS

Jaikumar Vijayan, ComputerWorld, Privacy alert: Cookie variants can be used to skirt blockers, anti-spyware tools (Dec. 5, 2007).*
Ashley Friedlein, E-consultancy.com, First party cookies set, or readable, by a third party? (Sep. 13, 2005).*
Danny Ng, Dannytalk.com, How to Track Sub-Domains / Cross-Domains in Analytics, (Apr. 5, 2009).*

(Continued)

*Primary Examiner* — David J Stoltenberg
*Assistant Examiner* — Brendon Beheshti
(74) *Attorney, Agent, or Firm* — Bookoff McAndrews, PLLC

(57) ABSTRACT

An advertiser participating in a method of targeting based on first party cookies may update its DNS record to include a subdomain that redirects to a server associated with an ad network. The ad network may incorporate that advertiser's subdomain in an ad pixel tag published on one or more of the advertiser's web pages, to set a cookie on the advertiser's domain. Specifically, when a user visits one of the advertiser's web pages, the ad pixel tag may be redirected by the advertiser's DNS update to an ad network server for receipt of a cookie that matches the subdomain. The ad network may distribute to its publishers an ad call that checks for the presence of any first party domain cookies set via the second stage, and then pass any such cookie data to the network's ad servers to decide which ad to serve.

28 Claims, 7 Drawing Sheets

(56) References Cited

OTHER PUBLICATIONS

International Search Report dated Jun. 13, 2014 in corresponding International Application PCT/US2014/018336.
Anonymous, "Advertising—Policies & Principles—Google," Feb. 5, 2013, retrieved from http://web.archive.org/web/20130205065651/http://www.google.com/policies/technologies/ads/ on Apr. 16, 2014.
Anonymous, "Domain (Internet)—Wikipedia," Feb. 23, 2013, pp. 1-6, retrieved from http://de.wikipedia.org/w/index.php?title=Domain_(Internet)&oldid=114591779 on Apr. 16, 2014.

* cited by examiner

SYSTEMS AND METHODS FOR ACCESSING FIRST PARTY COOKIES

TECHNICAL FIELD

Various embodiments of the present disclosure relate generally to accessing Internet cookies and performing electronic advertising. More specifically, exemplary embodiments of the present disclosure relate to systems and methods for targeting electronic advertising based on first party Internet cookies.

BACKGROUND

Internet cookies have become a ubiquitous and invaluable tool for performing internet advertising and other important online functions. Traditional techniques for targeting electronic advertising involve configuring users' Internet browsers such that third party cookies can be set, read from, and written to. When a cookie is set on a browser, one of the identifying elements of the cookie is the domain from which it was served. If an Internet user visits, for example, www.site.com and that site contains code to set a cookie, then that cookie will be set with "site.com" as its domain. Such a cookie is commonly referred to as a "first party cookie" because the domain of the cookie matches that of the site URL that the user visited in his or her browser. Continuing this illustrative example, site.com can also embed code that pulls content, such as ads, from URLs that are not on the site.com domain and those ads can also set cookies. For example, site.com can have code on its page that pulls an ad from, by way of example, www.adnetwork.com. The ad will be served from adnetwork.com and will set cookies on the adnetwork.com domain. Such a cookie is commonly referred to as a "third party cookie" because the domain of the cookie does not match that of the site URL visited by the user.

Online advertising may be significantly enhanced by web browsers that, by default or by settings, allow third party cookies, and by people who permit visited sites to set and read third party cookies. Use of third party cookies enables ad networks to access cookies that they set across a wide network of websites, thereby enabling behavioral and contextual advertising to web viewers across many visited websites. Specifically, web browsers that are set to allow third party cookies will allow, for example, adnetwork.com to set its cookie despite the user having visited www.site.com. Furthermore, the same browser setting will also allow adnetwork.com to access any cookies set under their domain regardless of which site the Internet user is visiting.

By way of background, ad networks typically have hundreds or thousands of partners (often referred to as "publishers") that publish online content along with "ad tags" provided by their partner ad network. For example, each of a news website (www.news.com), a blog (www.blog.com), and an informational website (www.info.com), among others, may engage an ad network to efficiently and profitably advertise to those websites' viewers. The ad network provides each of those sites with an ad tag having the ad network's domain, e.g., "adnetwork.com." For any visitors, or more specifically, visitors' browsers that allow third party cookies, the ad network may access cookie data of visitors to its partners' sites (i.e., across its entire network of sites), even though those sites' domains (e.g., www.news.com, etc.) do not match the ad network's domain. Specifically, the ad network's ad tag on each site may access cookie data associated with the domain of the ad tag. As a result, the ad network may learn more about a user's browsing history across its network, and therefore more about the user's likely demographics, interests, purchasing goals, and other useful advertising information.

Web browsers that are set to allow only first party cookies will allow cookies to be set only from the site being visited by the user. Furthermore, they will only allow access to cookies set on the domain of the site being visited. As a result, ad networks are traditionally unable to perform advanced targeting and advertising in relation to web browsers that do not enable third party cookies. Because online advertisers are interested in improved targeting to their intended audience, ad networks also have a strong interest in providing targeting even to browsers that are set to accept and provide access only to first party cookies.

Accordingly, a need exists for systems and methods for enabling targeting of electronic advertisements to browsers that accept only first party cookies. More generally, a need exists for systems and methods for electronic advertising based on first party cookie data.

SUMMARY OF THE DISCLOSURE

The present disclosure describes systems and methods for addressing limitations associated with traditional third party cookies, by allowing both third party ad networks and publishers to interact with cookies on browsers set to allow only first party cookies, while adhering to browser privacy settings. In one embodiment, addressing these limitations may generally involve: (1) first, setting a cookie on a user's browser, the cookie having the advertiser's domain and being served from a third party cookie server; and (2) second, checking, at a third party publisher website, for the existence of that cookie using an ad tag that does not necessarily match the advertiser's domain.

In one embodiment, a method of performing these tasks may be described as involving three stages, which are separated in time. In a first stage, an advertiser participating in a method of targeting based on first party cookies may update its DNS record to include a subdomain that redirects to a server associated with an ad network. In a second stage, the ad network may incorporate that advertiser's subdomain in an ad pixel tag published on one or more of the advertiser's web pages, to set a cookie on the advertiser's domain. Specifically, when a user visits one of the advertiser's web pages, the ad pixel tag may be redirected by the advertiser's DNS update to an ad network server for receipt of a cookie that matches the subdomain. In a third stage, the ad network may distribute to its publishers an ad call that checks for the presence of any first party domain cookies set via the second stage, and then pass any such cookie data to the network's ad servers to decide which ad to serve. Specifically, the ad call may rotate through all subdomains set by advertisers via the second stage, and call a URL associated with each domain to determine whether the cookie is present. For each domain having a matched cookie, that cookie's data may be passed to the network ad server for an ad decision.

According to certain embodiments, a method is disclosed for accessing first party Internet cookies. The method includes receiving, over an electronic network, a request for an electronic advertisement or an Internet cookie, wherein the request is received in response to a user requesting content from a subdomain of an advertising entity domain; sending, to a device associated with the user, an Internet cookie having the subdomain of the advertising entity domain; receiving, from the device associated with the user, a request for content from the subdomain of the advertising entity domain, wherein the request is received in response to the user requesting content from a domain of an online publisher; and accessing data stored in the Internet cookie sent to the device associated with the user.

According to certain embodiments, a system is disclosed for accessing first party Internet cookies. The system includes a data storage device storing instructions for accessing first party Internet cookies; and a processor configured to execute the instructions to perform a method including: receiving, over an electronic network, a request for an electronic advertisement or an Internet cookie, wherein the request is received in response to a user requesting content from a subdomain of an advertising entity domain; sending, to a device associated with the user, an Internet cookie having the subdomain of the advertising entity domain; receiving, from the device associated with the user, a request for content from the subdomain of the advertising entity domain, wherein the request is received in response to the user requesting content from a domain of an online publisher; and accessing data stored in the Internet cookie sent to the device associated with the user.

According to certain embodiments, a method is disclosed for accessing an Internet browser cookie. The method includes receiving, over an electronic network, a request for an electronic advertisement or an Internet browser cookie, wherein the request is received in response to a user requesting content from a subdomain of a domain; sending, to a device associated with the user, an Internet browser cookie having the subdomain of the domain; receiving, from the device associated with the user, a request for content from the subdomain of the domain, wherein the request is received in response to the user requesting content from a domain of an online publisher; and accessing data stored in the Internet browser cookie sent to the device associated with the user.

According to certain embodiments, a system is disclosed for accessing first party Internet cookies. The system includes a data storage device storing instructions for accessing first party Internet cookies; and a processor configured to execute the instructions to perform a method including: receiving, over an electronic network, a request for an electronic advertisement or an Internet cookie, wherein the request is received in response to a user requesting content from a first domain; sending, to a device associated with the user, an Internet cookie having the first domain; receiving, from the device associated with the user, a request for content from the first domain, wherein the request is received in response to the user requesting content from a second domain; and accessing data stored in the Internet cookie sent to the device associated with the user.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for addressing limitations associated with traditional third party cookies, by allowing both third party ad networks and publishers to interact with cookies on browsers set to allow only first party cookies, while adhering to browser privacy settings. In one embodiment, addressing these limitations may generally involve: (1) first, setting a cookie on a user's browser, the cookie having the advertiser's domain and being served from a third party cookie server; and (2) second, checking, at a third party publisher website, for the existence of that cookie using an ad tag that does not necessarily match the advertiser's domain.

In one embodiment, a method of performing these tasks may be described as involving three stages, which are separated in time. In a first stage, an advertiser participating in a method of targeting based on first party cookies may update its DNS record to include a subdomain that redirects to a server associated with an ad network. In a second stage, the ad network may incorporate that advertiser's subdomain in an ad pixel tag published on one or more of the advertiser's web pages, to set a cookie on the advertiser's domain. Specifically, when a user visits one of the advertiser's web pages, the ad pixel tag may be redirected by the advertiser's DNS update to an ad network server for receipt of a cookie that matches the subdomain. In a third stage, the ad network may distribute to its publishers an ad call that checks for the presence of any first party domain cookies set via the second stage, and then pass any such cookie data to the network's ad servers to decide which ad to serve. Specifically, the ad call may rotate through all subdomains set by advertisers via the second stage, and call a URL associated with each domain to determine whether the cookie is present. For each domain having a matched cookie, that cookie's data may be passed to the network ad server for an ad decision.

Figure 1:
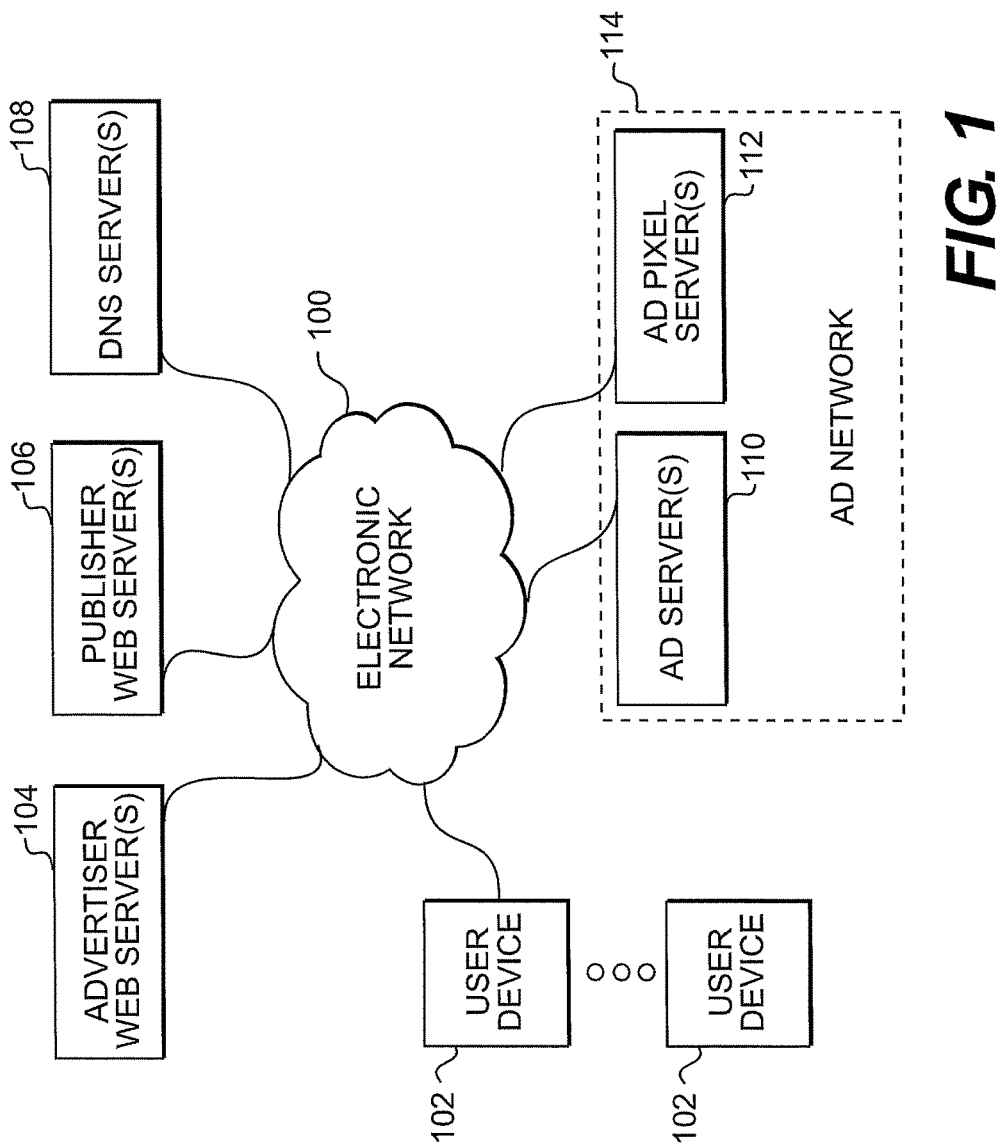
FIG. 1 is a schematic diagram of an environment in which electronic advertising may be performed and a system for electronic advertising, according to an exemplary embodiment of the present disclosure.

FIG. 1 is a schematic diagram of an environment in which electronic advertising may be performed consistent with these methods and a system for accessing first party cookies and performing electronic advertising, according to an exemplary embodiment of the present disclosure. Specifically, FIG. 1 illustrates an exemplary environment including a plurality of user devices 102, advertiser web servers 104, publisher web servers 106, DNS servers 108, ad servers 110, and ad pixel servers 112, all disposed in communication with an electronic network 100, such as the Internet.

In one embodiment, user devices 102 may be owned and used by one or more people, who may be viewers of web pages over the Internet, either through a mobile browser or web browser stored on respective user devices. User devices 102 may include any type of electronic device configured to send and receive data, such as websites and electronic advertisements, over electronic network 100. For example, each of user devices 102 may include a server, personal computer, tablet computer, mobile device, smartphone, and/or personal digital assistant ("PDA") disposed in communication with electronic network 100. For example, in one embodiment, each of user devices 102 may be a handheld device, such as an Apple iPhone, Apple iPad, Samsung Galaxy, Amazon Kindle, Microsoft Surface, or any other equivalent or similar device. Each of user devices 102 may have a web browser or mobile browser installed for receiving and displaying web and/or ad content from web servers. Thus, each of user devices 102 may be configured to receive and display data that is received from one or more of advertiser web servers 104, publisher web servers 106, DNS servers 108, ad servers 110, and/or ad pixel servers 112, over electronic network 100.

Advertiser web servers 104 may be owned and/or operated by any entities having content, such as online advertisements (e.g., display ads, banner ads, pop-ups, etc.) desired to be delivered to online users. Advertisers may interact with user devices 102, publisher web servers 106, DNS servers 108, ad servers 110, and/or ad pixel servers 112, through advertiser web servers 104 connected to electronic network 100. Thus, advertisers may be able to communicate advertising information, such as ad information, targeting information, consumer information, budget information, bidding information, etc., to other entities in the environment of FIG. 1.

Publisher web servers 106 may be owned and/or operated by any entities having inventories of available online advertising space. For example, publishers may include online content providers, search engines, e-mail programs, or any other online site or program having online user traffic. Publishers may interact with user devices 102, advertiser web servers 104, DNS servers 108, ad servers 110, and/or ad pixel servers 112, through publisher web servers 106 connected to electronic network 100. Thus, publishers may be able to communicate inventory information, such as site information, demographic information, cost information, etc., to other entities in the environment of FIG. 1.

DNS servers 108 may include name servers that host a network service for providing responses to queries against a directory service. Specifically, DNS servers 108 may map a human-recognizable identifier to a systematic, e.g., numeric, identification or addressing component according to a network service protocol, such as numeric Internet Protocol (IP) addresses. DNS servers 108 may also identify and locate computer systems, servers, and other resources on the Internet. DNS servers 108 may interact with user devices 102, advertiser web servers 104, publisher web servers 106, ad servers 110, and/or ad pixel servers 112 over electronic network 100.

Ad servers 110 and ad pixel servers 112 may include any type of servers configured to process advertising information from advertisers and/or site information from publishers, and send and receive ad requests and information from user devices 102, either directly or indirectly. In one embodiment, ad servers 110 and/or ad pixel servers 112 may be owned and operated by an ad network 114. Ad network 114 may be a business that receives ad buys from advertisers, and serves ads on inventory supplied by publishers. Thus, ad network 114 may collect money from advertisers, and purchase impressions from publishers.

In certain embodiments, ad servers 110 and ad pixel servers 112 may be remote web servers that receive advertising information from advertisers and serve ads to be placed by publishers. Ad servers 110 and ad pixel servers 112 may be configured to serve ads across various domains of publishers, for example, based on advertising information provided by advertisers. Ad servers 110 and ad pixel servers 112 may also be configured to serve ads based on contextual targeting of web sites, search results, and/or user profile information. In some embodiments, ad servers 110 and ad pixel servers 112 may be configured to serve ads based on ad tags served by advertiser web servers 104 and/or publisher web servers 106, and on ad requests received from user devices 102. Ad servers 110 and ad pixel servers 112 may be configured to send and receive data from user devices 102, advertiser web servers 104, publisher web servers 106, and/or DNS servers 108, over electronic network 100.

Ad servers 110 and ad pixel servers 112 may include any type or combination of computing systems, such as clustered computing machines and/or servers. In one embodiment, each of ad servers 110 and ad pixel servers 112 may be an assembly of hardware, including a memory, a central processing unit ("CPU"), and/or a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Regardless of specific physical components or layout, one or more of ad servers 110, ad pixel servers 112, or any other servers or systems associated with ad network 114, may be programmed with instructions to perform a method of setting and accessing first party cookies according to the exemplary disclosed methods, such as the exemplary methods described with respect to FIGS. 2-6B below.

Figure 2:
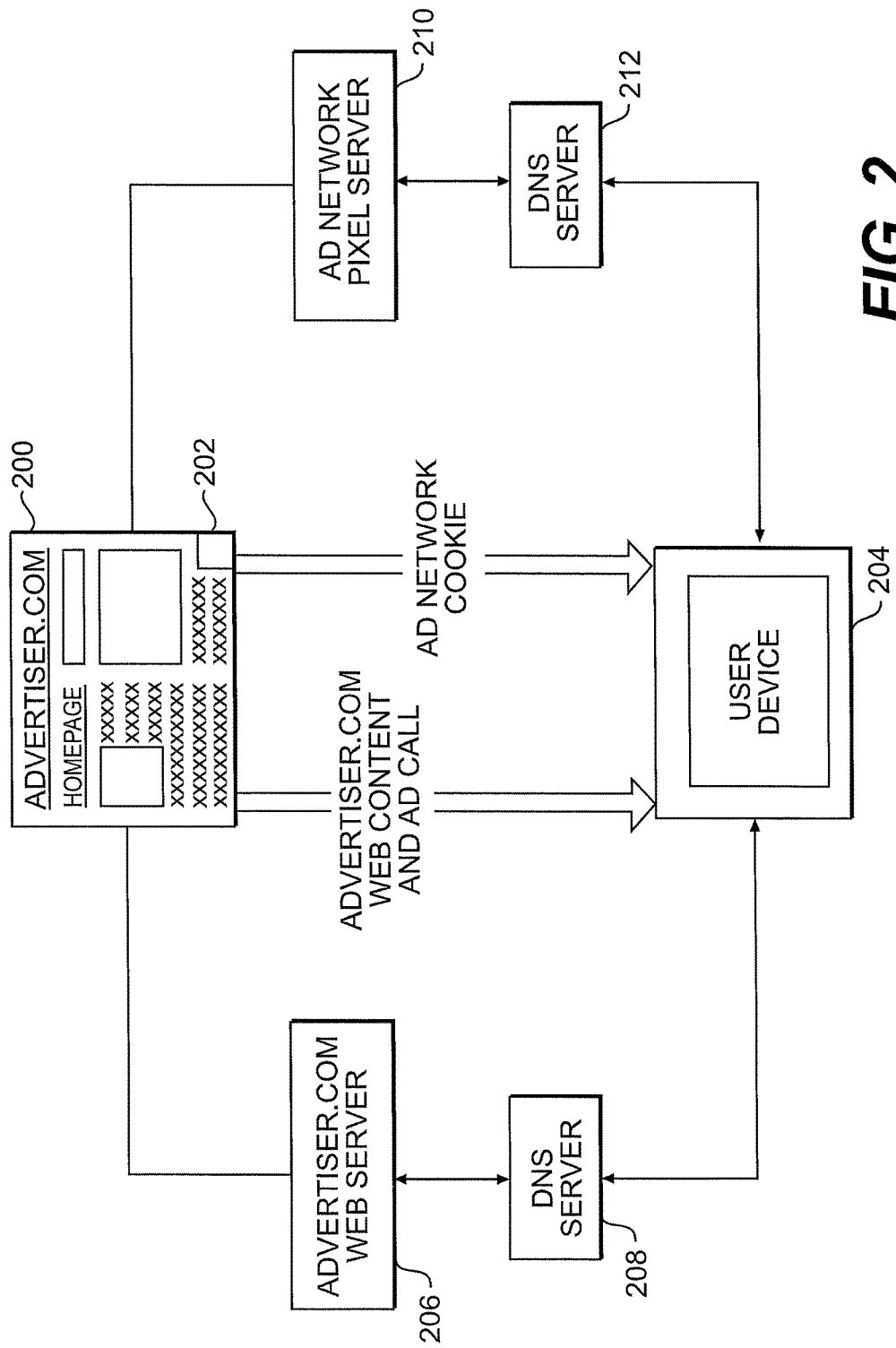
FIG. 2 is a flow diagram of a method for setting first party cookies for targeting electronic advertising, according to an exemplary embodiment of the present disclosure.

FIG. 2 is a flow diagram of a method for setting first party cookies for targeting electronic advertising (i.e., in a second stage, as discussed above), according to an exemplary embodiment of the present disclosure. Specifically, as discussed above, a method of setting first party cookies for targeting electronic advertising may include a user first visiting an advertiser website 200 (depicted as "advertiser.com") using a user device 204. Advertiser website 200 may include web content and an ad pixel tag 202. In general, when a user device 204 visits advertiser website 200, the user device 204 may receive from the advertiser both the web content and an ad call. Specifically, the user device 204 may receive, e.g., from an advertiser.com web server 206 via a DNS server 208, both the content associated with the advertiser website 200 and, based on ad pixel tag 202, an ad call including instructions, or code, for receiving an ad network cookie.

Thus, in addition to receiving the advertiser website content and an ad call, the user device 204 may also receive an ad network cookie, by executing the ad call received from the advertiser web server 206. Specifically, a web browser or mobile browser stored on user device 204 may execute the ad call received from advertiser website server 206, causing the browser to request a subdomain (e.g., "adnetwork.advertiser.com") associated with the advertiser (e.g., "advertiser.com"). Because the advertiser may have previously updated a DNS record to redirect requests for the subdomain to an ad network (i.e., in a first stage, as discussed above), user device 204 may then direct an ad request, per the received ad call, to an ad network pixel server 210, via a DNS server 212 that executes the redirect. The user device 204 may then receive an ad network cookie from the ad network pixel server 210. As will be discussed in more detail, even if a browser associated with user device 204 is configured to accept only first party cookies, user device 204 may receive an ad network cookie from an ad network server, due to the DNS redirect, and because the ad call and cookie share a subdomain (e.g., "adnetwork.advertiser.com") of the advertiser domain ("advertiser.com").

Having set an ad network cookie on user device 204 (i.e., in a second stage), FIG. 3 now describes a method for later accessing such first party cookies (i.e., in a third stage, as described above) and performing targeted electronic advertising, according to an exemplary embodiment of the present disclosure. Specifically, user device 204 may, at a later time (i.e., after visiting the advertiser website 200), visit a publisher website 300. Upon requesting publisher website 300, user device 204 may receive from a publisher.com web server 306, via DNS server 308, both publisher.com web content and an ad call.

A web browser or mobile browser stored on user device 204 may execute the ad call received from publisher website server 306, causing the browser to request a subdomain (e.g., "adnetwork.advertiser.com") associated with the advertiser and matching a cookie domain set above in the second stage. Specifically, the user device 204 may execute code that requests the subdomain from ad network pixel server 310, via a DNS server 312. If the user device 204 contains a cookie having a subdomain matching the requested subdomain (e.g., "adnetwork.advertiser.com"), then the ad network pixel server 310 may send the user device 204 a pixel image, thereby granting the ad network pixel server 310 access to the stored cookie of that subdomain. If the user device 204 does not contain a cookie having a subdomain matching the requested subdomain, then the ad network pixel server 310 may send the user device 204 a broken image.

Having granted access to cookie data associated with the subdomain, user device 204 may now request a targeted ad from ad network ad server 314. Ad network ad server 314 may analyze the received cookie data and identify an ad targeted to user device 204, based on the analyzed cookie data. Ad network ad server 314 may then either send the identified targeted ad to user device 204, or send user device 204 instructions to receive the identified targeted ad. As will be discussed in more detail, even if a browser associated with user device 204 is configured to accept only first party cookies, user device 204 may grant access to an ad network cookie to an ad network server (one or both of ad network pixel server 310 and ad network ad server 314), because the ad call and cookie share a subdomain (e.g., "adnetwork.advertiser.com") of the advertiser domain ("advertiser.com"). Furthermore, even if the browser of user device 204 is configured to accept only first party cookies, ad network ad server may still generate and send user device 204 targeted ads based on data stored in the cookie sharing the subdomain.

Figure 3:
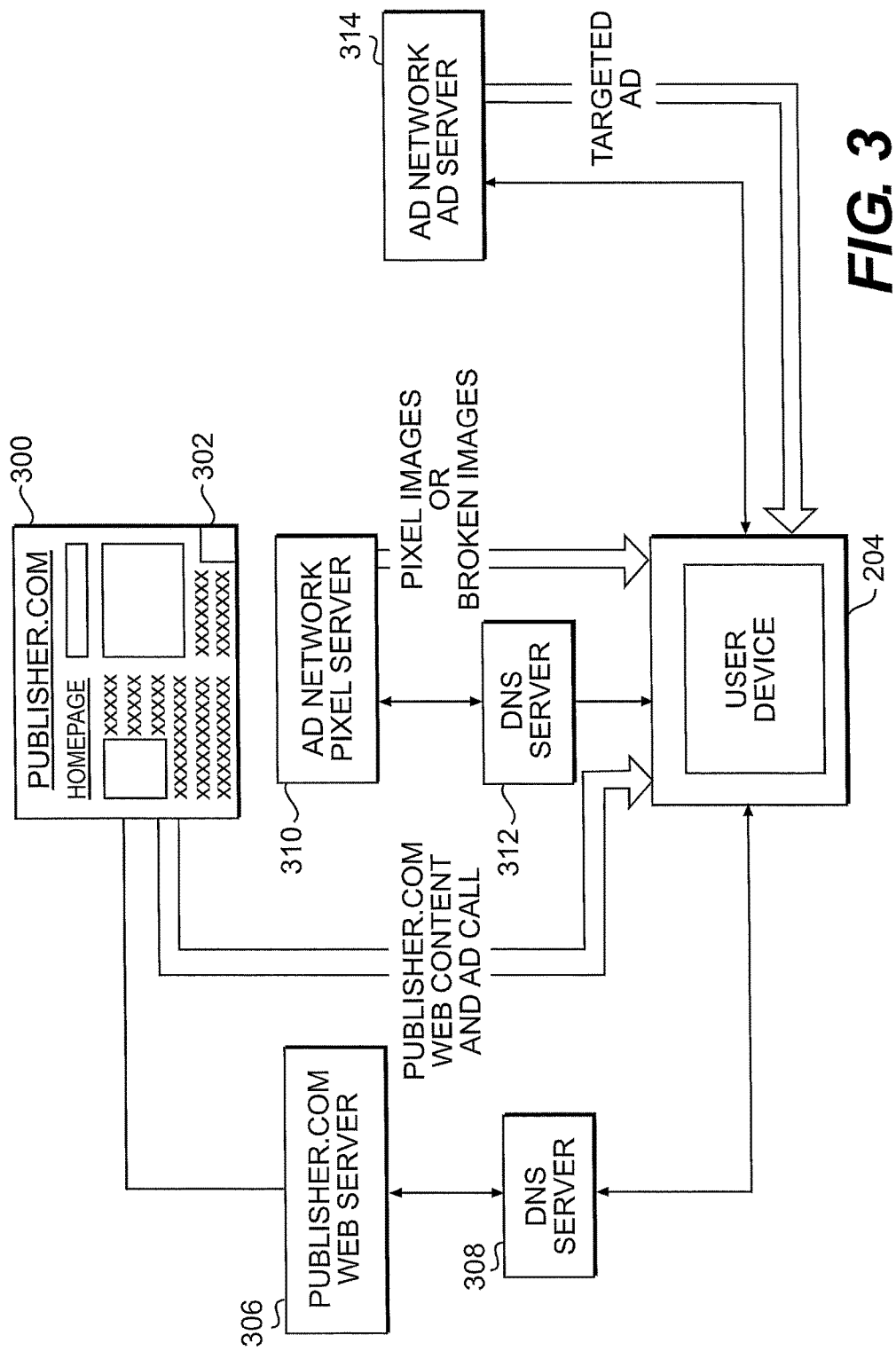
FIG. 3 is a flow diagram of a method for accessing first party cookies and performing targeted electronic advertising, according to an exemplary embodiment of the present disclosure.
Figure 4:
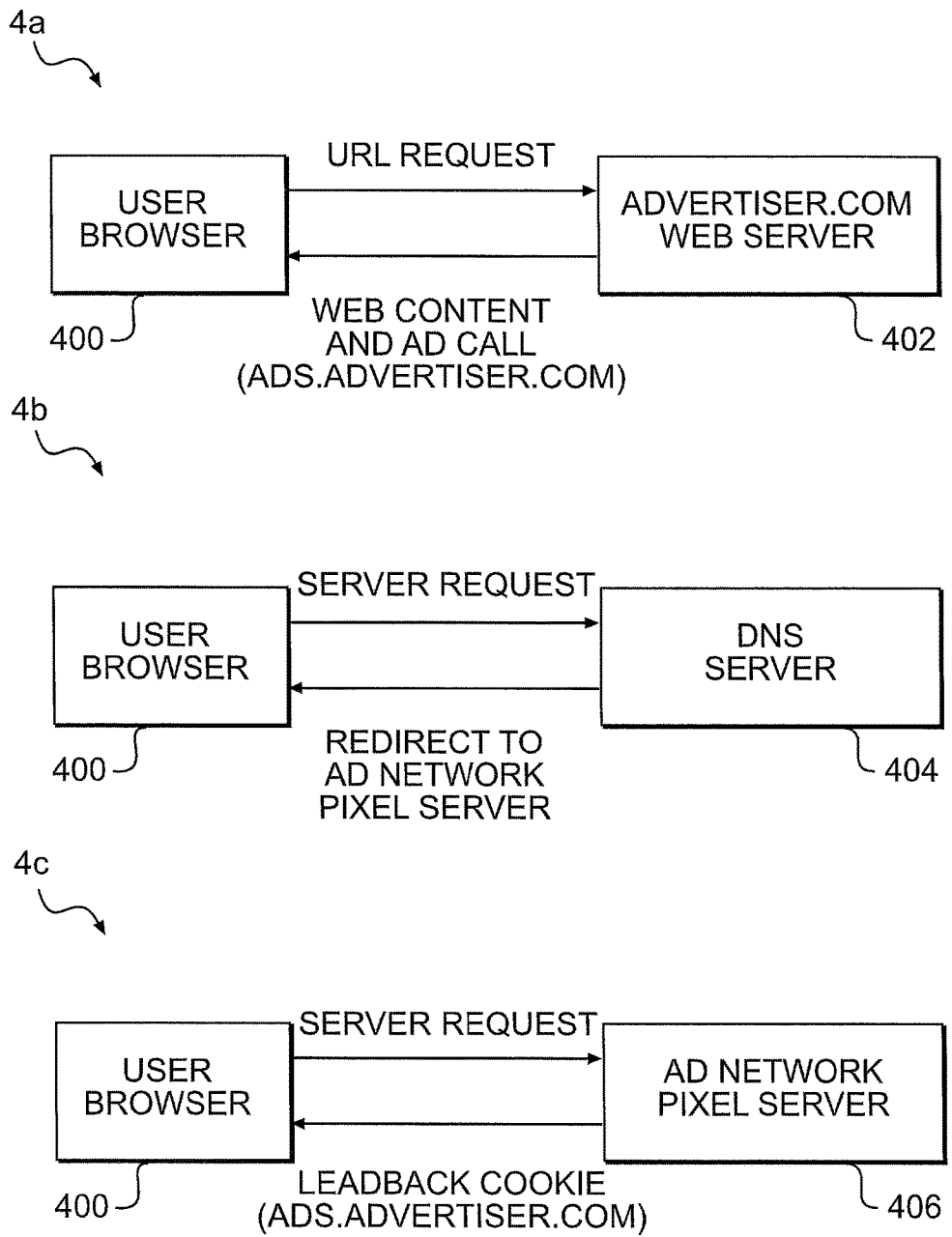
FIG. 4 is a flow diagram of a method for setting first party cookies on a user browser, according to an exemplary embodiment of the present disclosure.
Figure 5:
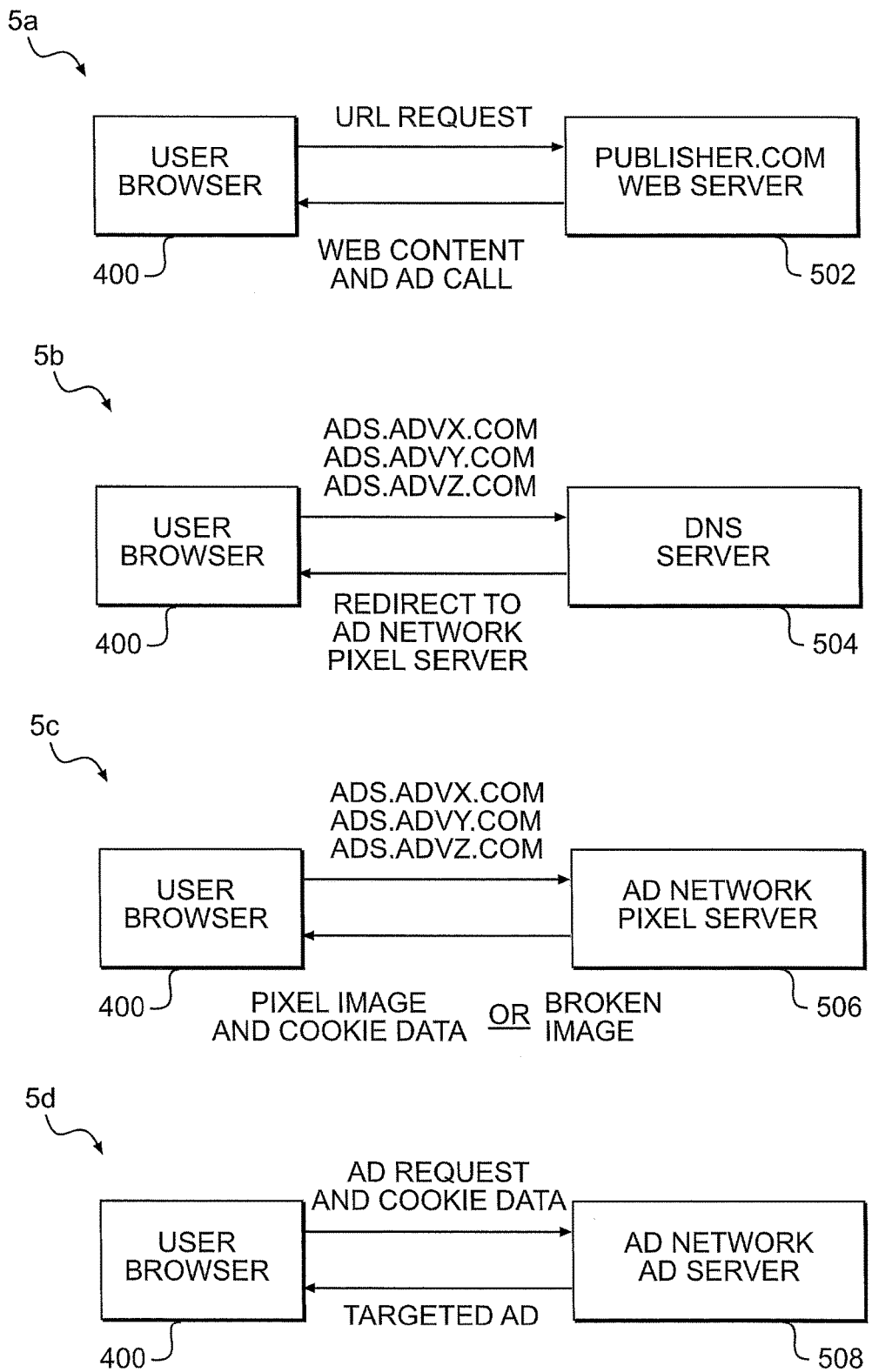
FIG. 5 is a flow diagram of a method for accessing first party cookies on a user browser and performing targeted electronic advertising, according to an exemplary embodiment of the present disclosure.

FIGS. 4 and 5 depict exemplary embodiments of steps for performing the methods of FIGS. 2 and 3, respectively. Specifically, FIG. 4 is a flow diagram of a method for setting first party cookies on a user browser 400, according to an exemplary embodiment of the present disclosure. FIG. 5 is a flow diagram of a method for accessing such first party cookies on a user browser 400, and performing targeted electronic advertising, according to an exemplary embodiment of the present disclosure.

As shown in FIG. 4, in one embodiment, a method for setting first party cookies on a user browser 400 may include several steps of a user browser 400 interacting with an advertiser (e.g., "advertiser.com") web server 402 (step 4a), a DNS server 404 (step 4b), and an ad network pixel server 406 (step 4c). First, as shown in step 4a, user browser 400 may send a URL request to advertiser web server 402. As discussed above, the advertiser may have included an ad network pixel tag on its web page containing, for example, the "adnetwork.advertiser.com" sub-domain as its source. Thus, advertiser web server 402 may send back to the user browser 400 both web content associated with the advertiser's website and an ad call associated with that subdomain. The ad call may include instructions to request an ad from a subdomain of the advertiser (e.g., "ads.advertiser.com" or "adnetwork.advertiser.com", etc.).

At step 4b, upon receiving the ad call, the user browser 400 may request the indicated subdomain from a DNS sever 404, which based on instructions from the advertiser (e.g., in the first stage) may redirect user browser 400 to an ad network pixel server 406. At step 4c, having been redirected to the ad network pixel server 406, user browser 400 may issue a server request, such as an image tag (e.g., pixel tag) or ad call, to ad network pixel server 406, which may set a leadback cookie on user browser 400. As shown in FIG. 4, the leadback cookie may share a subdomain ("ads.advertiser.com") with that of the ad call, and the leadback cookie may be served from the ad network pixel server 406 even though the ad call and cookie subdomain ("ads.advertiser.com") is a subdomain of the advertiser domain ("advertiser"), and not the ad network.

As discussed above, having set an ad network cookie on user browser 400 (i.e., in a second stage), FIG. 5 now describes a method for accessing such first party cookies (i.e., in a third stage, as described above) and performing targeted electronic advertising, according to an exemplary embodiment of the present disclosure. As shown in FIG. 5, in one embodiment, a method for accessing first party cookies on a user browser 400, and performing targeted electronic advertising may include several steps of a user browser 400 interacting with a publisher web server 502

(step 5a), a DNS server 504 (step 5b), an ad network pixel server 506 (step 5c), and an ad network ad server 508 (step 5d).

As shown in FIG. 5, in step 5a, user browser 400 may be pointed to a publisher (e.g., "publisher.com") web server 502. The publisher web server 502 may send to user browser 400 both web content associated with the publisher website and an ad call. In one embodiment, the received ad call may be a "universal ad call" disseminated to multiple publishers within a network of the ad network. In one embodiment, the ad call may include a segment of, e.g., JavaScript code that initiates several operations, including checking for JavaScript accessibility, checking whether cookies are turned on, making decisions based on HTTP metadata, and writing the ad call code (image tag equivalent). The code in the received ad call may also be configured to load up the domains, cycle through them, and make an image SRC call.

In step 5b, user browser 400 may execute code in the updated universal ad call to perform a server call under each subdomain generated in the first stage, such as through a plurality of pixel calls, each of which checks a generated subdomain. Specifically, execution of code in the updated universal ad call may cause user browser 400 to cycle through one or more server calls, each server call being associated with a subdomain of an advertiser participating in a method of targeting based on first party cookies, e.g., via the second stage, or the method of FIG. 4. In one embodiment, the user browser 400 may cycle through the domains, e.g., using "for loop" logic. When embedding URLs or code that makes URL calls, HTML may, based on an associated IMG tag, retrieve content from any URL stored in a corresponding SRC element. Thus, for example, the user browser 400 may call each of "ads.advx.com," "ads.advy.com," "ads.advz.com," etc. where "ads" is a subdomain associated with the ad network, and the method involves advertisers with domains "advx.com," "advy.com," and "advz.com."

However, as shown in step 5b, because each advertiser associated with the exemplary method may have updated its respective DNS record to redirect to an ad network server, a DNS sever 504 may redirect ad calls from user browser 400 to an ad network pixel server.

Thus, as shown in step 5c, user browser 400 may redirect server calls for, e.g., "ads.advx.com," "ads.advy.com," "ads.advz.com," and so on, to ad network pixel server 506. In one embodiment, the ad call received from the publisher web server 502 in step 5a may initiate code that checks for each advertiser's cookie, and stores all cookie matches for passing along to an ad network ad server. As shown in step 5c, ad network pixel server 506 may then return either a pixel image and cookie data or a broken image to the user browser 400. As discussed above with respect to FIG. 5, if the user browser 400 stores a cookie having a subdomain matching the requested subdomain (e.g., "adnetwork.advertiser.com"), then the ad network pixel server 506 may send the user browser 400 a pixel image, thereby granting the ad network pixel server 506 access to the stored cookie of that subdomain. If the user browser 400 does not contain a cookie having a subdomain matching the requested subdomain, then the ad network pixel server 506 may send the user browser 400 a broken image.

In one illustrative embodiment, a user may have visited, for example, five advertiser websites that contain ad pixel tags set according to the second stage (e.g., FIGS. 2 and 4), and therefore have stored five cookies, each under a different subdomain. Because the user browser 400 interprets the ad call as a request to view the website of the subdomain, the browser may enable access to the cookie stored for the domain, and the ad network server and/or ad pixel server may obtain access to the contained cookie data.

Since the ad network server and/or ad network pixel server 506 may now have access to cookie data of user browser 400, ad network 114 (FIG. 1) and its components may also have access to that data. The network pixel server 506 or ad network ad server 508 may read the cookie to see if it exists. For example, executed code, such as JavaScript code, may read and store the cookie data locally on the browser 400 and then send that data to one of the ad or network servers. Thus, as shown in step 5d, user browser 400 may issue an ad request to ad network ad server 508. The request may include or grant access to cookie data associated with one of the requested subdomains, or alternatively, the ad network ad server 508 may have already received or accessed that cookie data. It should be appreciated that the cookie data may include any data commonly stored in a cookie, such as user ID information, browsing history, purchasing history, user profile information, demographic information, shopping cart history, click history, impression history, predictions of user interests, and so on. Based on data stored in one or more accessed cookies, ad network ad server 508 may then identify or generate an electronic advertisement targeted to the user associated with user browser 400.

It should also be appreciated that such accessed cookie data may be used for many other purposes other than targeted advertisements, such as frequency capping, saving state for purposes of maintaining log-in information, shopping carts, etc., or any other online function typically facilitated by third party cookies. Publisher impressions may also be segmented by different subject matter, for predicting, optimizing, and targeting advertisements based on groups of users that correspond to those publisher subject matter.

Figure 6A:
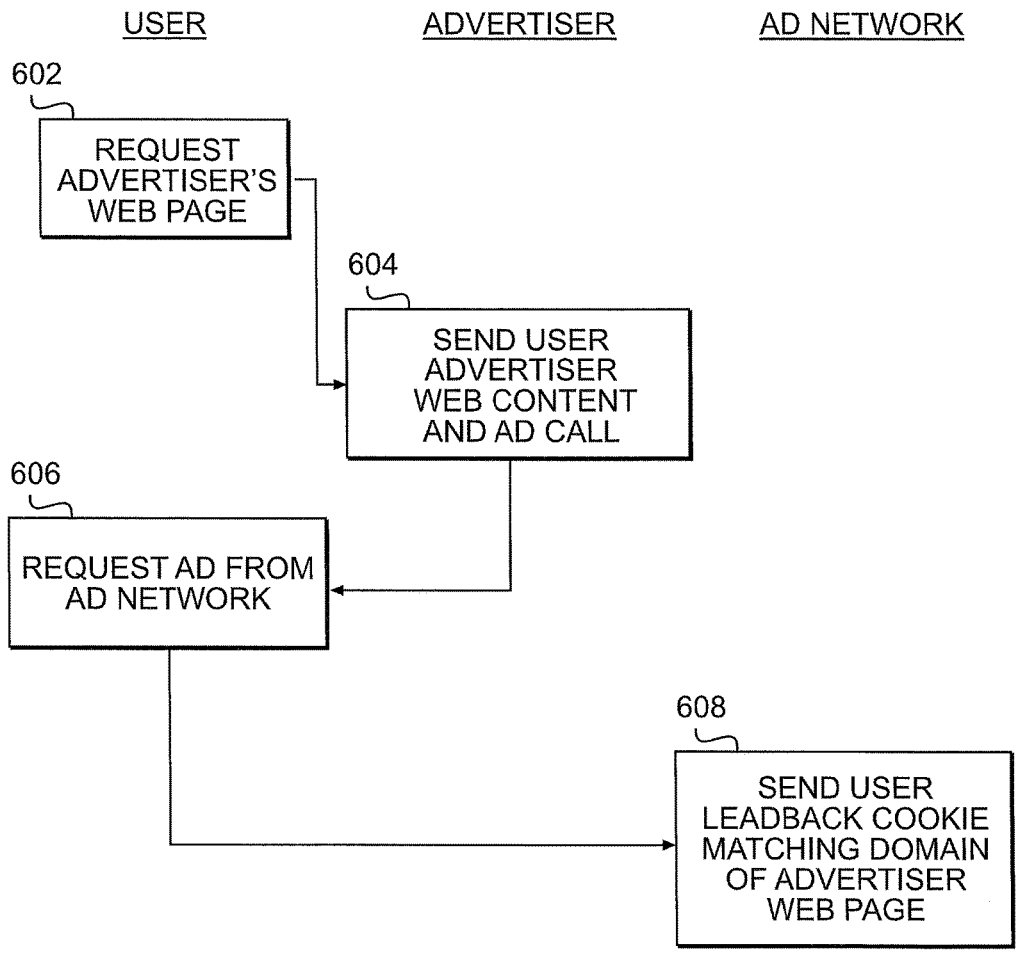
FIG. 6A is a flow diagram of a method for entities to set first party cookies for targeting electronic advertising, according to an exemplary embodiment of the present disclosure.
Figure 6B:
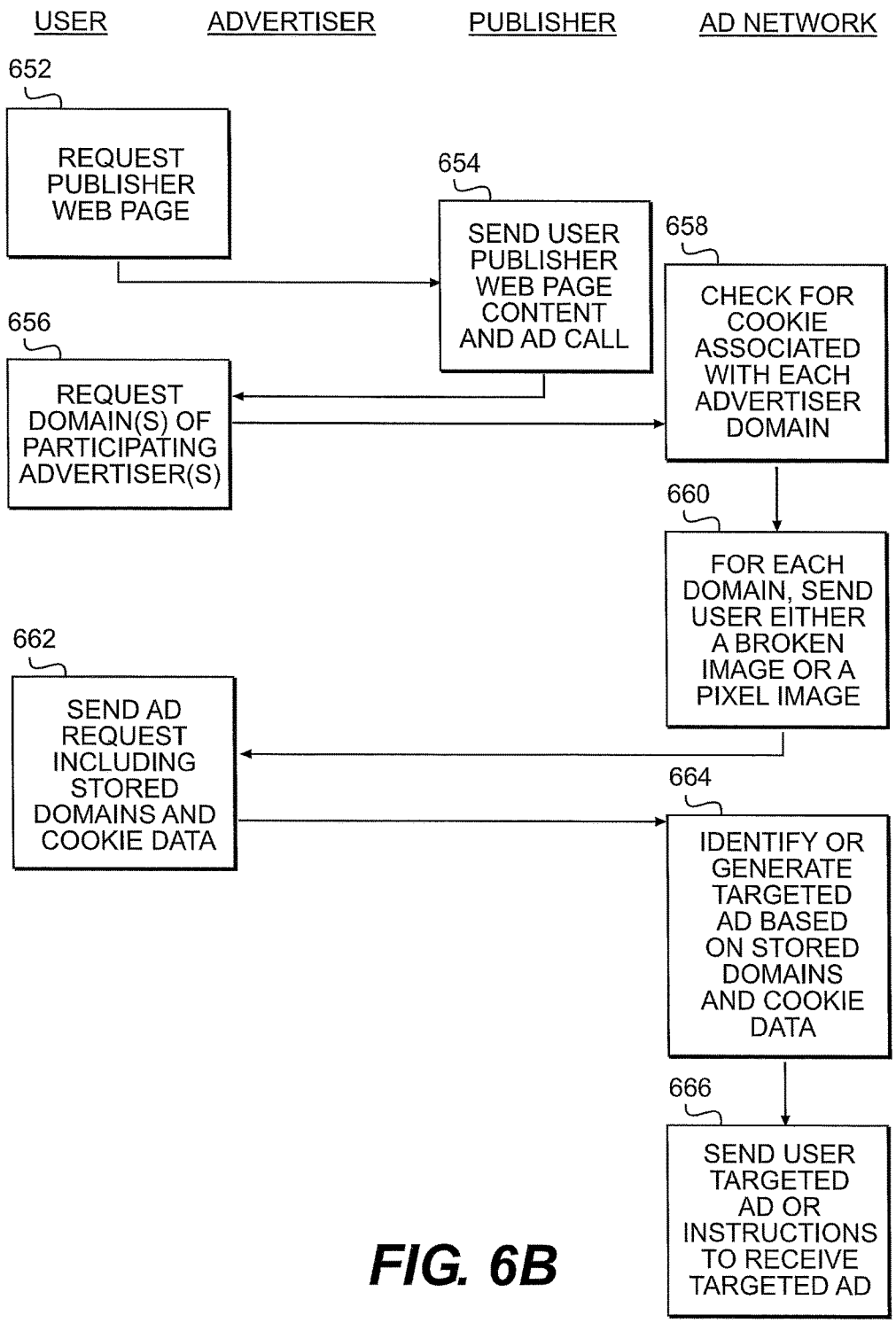
FIG. 6B is a flow diagram of a method for entities to access first party cookies and perform targeted electronic advertising, according to an exemplary embodiment of the present disclosure.

Referring now to FIGS. 6A and 6B, exemplary methods for setting and accessing first party cookies will now be described with respect to steps performed by certain entities, including a user, advertiser, publisher, and ad network. FIG. 6A is a flow diagram of a method for setting first party cookies for targeting electronic advertising, according to an exemplary embodiment of the present disclosure. As shown in FIG. 6A, an exemplary method may include a user requesting to view an advertiser's web page (step 602), such as through a URL request, by pointing a browser such as user browser 400 to the advertiser's domain. The advertiser may, in response the user's request, send the user both web content associated with the advertiser's domain, and an ad call (step 604). For example, an ad tag may initialize an ad call or a pixel call. As discussed above with respect to FIGS. 2 and 4, the ad call may be associated with a subdomain that resolves to an ad network server associated with the advertiser. In response to receiving the ad call from the advertiser, the user may request an ad from the ad network (step 606). In response to receiving the ad request from the user, the ad network may send the user a leadback cookie matching a domain of the advertiser (step 608). Specifically, as discussed above, even if the user's browser is configured to accept only first party cookies, the user may receive an ad network cookie from the ad network, due to the advertiser's DNS subdomain redirect, and because the ad call and cookie share a subdomain (e.g., "adnetwork.advertiser.com") of the advertiser domain (e.g., "advertiser.com").

FIG. 6B is a flow diagram of a method for accessing first party cookies set according to the method of FIG. 6A, and performing targeted electronic advertising, according to an exemplary embodiment of the present disclosure. As shown in FIG. 6B, at another time after the method of FIG. 6A was performed, the same user may request the web page of a publisher, where the web page contains an ad network pixel tag, as discussed above with respect to FIGS. 3 and 5 (step 652). In response to the user's request, the publisher may send the user both the web content associated with the publisher's web page and an ad call (step 654). Specifically, as discussed above, the ad call may be a universal ad call containing code that, when executed, initiates server calls to a plurality of advertiser subdomains generated according to the methods of FIGS. 2 and 4. In response to receiving such an ad call, the user may request the one or more subdomains of participating advertisers (i.e., those having subdomains associated with the ad network) (step 656). Because the advertisers associated with those subdomains may have updated respective DNS records to redirect to one or more ad network servers, the ad network may, upon receiving requests for those subdomains, check for a cookie associated with each advertiser subdomain (step 658).

Specifically, as described above with respect to FIGS. 3 and 5, the ad network may then return either a pixel image and cookie data, or a broken image, to the user (step 660). As discussed above with respect to FIG. 5, if the user's browser stores a cookie having a subdomain matching the requested subdomain (e.g., "adnetwork.advertiser.com"), then the ad network may send the user a pixel image, thereby granting the ad network access to the stored cookie of that subdomain. If the user does not contain a cookie having a subdomain matching the requested subdomain, then the ad network may send the user a broken image. Thus, the ad network may be granted access to cookie data associated with advertiser subdomains.

As shown in FIG. 6B, the user may then send an ad request to the ad network, based on any stored domains or accessed cookie data (step 662). For example, in one embodiment, based on the ad call received from the publisher, the user's browser may request a targeted ad from the ad network. Because the ad network has been granted access to cookie data associated with advertiser subdomains, the ad network may identify or generate a targeted ad based on one or more of the stored advertiser domains and cookie data (step 664), which were obtained as discussed above. Finally, the ad network may send the user the identified targeted ad, or send the user instructions to receive the identified targeted ad (step 666). Thus, even if the user's browser is configured to accept only first party cookies, the user's browser may grant the ad network access to an ad network cookie, because the ad call and cookie share a subdomain of the advertiser domain. Furthermore, even if the user's browser is configured to accept only first party cookies, the ad network may still generate and send the user targeted ads based on data stored in the cookie sharing the subdomain.

As described above, the presently disclosed systems and methods may facilitate functionality typically associated with third party cookies even in a first party cookie environment. Specifically, even though an ad network server may set first party cookies on a user's device, such a cookie may be set according to an ad tag set by the website visited by the user, and therefore satisfy the user's cookie permissions, and the browser's cookie settings. Likewise, even though the ad network may access such first party cookies having the advertiser subdomain, access to those cookies may be enabled by execution of an ad call served from an ad tag of a website visited by the user, and again therefore satisfy the user's cookie permissions, and the browser's cookie settings.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for accessing first party Internet cookies, the method including:
   receiving, over an electronic network, a request for an electronic advertisement or an Internet cookie, in response to a user requesting content from a subdomain of an advertiser domain associated with the user viewing a website of the advertiser;
   sending, from an ad server associated with an ad network to a device associated with the user, an Internet cookie that is accessible by the ad server and that has the subdomain of the advertiser domain;
   receiving, from the device associated with the user, a request for content from a domain of a website of an online publisher, the website of the online publisher including a universal ad call configured to cause a browser of the user to make server calls to a plurality of subdomains associated with cookies set by advertisers, the universal ad call being provided to a plurality of online publishers, one of which is the online publisher;
   receiving, from the device associated with the user, upon transmitting the website of the online publisher to the user and based on execution of the universal ad call by the browser of the user, a plurality of server calls to a plurality of subdomains associated with cookies set by advertisers, one of which is the subdomain of the advertiser domain; and
   upon identifying, by an ad server receiving the plurality of server calls, that the device associated with the user has stored the Internet cookie having the subdomain of the advertiser domain, accessing, by the ad server, data stored in the Internet cookie sent to the device associated with the user.

2. The method of claim 1, wherein the user requests the content from the subdomain of the advertiser domain upon visiting a website of the advertiser domain.

3. The method of claim 1, wherein the website of the advertiser domain contains an ad pixel tag served from the subdomain of the advertiser domain.

4. The method of claim 1, wherein the request for the electronic advertisement or Internet cookie is received based on a DNS rerouting of the subdomain of the advertiser domain.

5. The method of claim 1, further comprising:
   receiving, from the device associated with the user, the plurality of server calls including requests for content from a plurality of subdomains of advertiser domains; and
   accessing data stored in the Internet cookie sent to the device associated with the user.

6. The method of claim 5, wherein the plurality of requests for content from the plurality of subdomains of advertiser domains are performed based on the universal ad call being served from a website of the online publisher.

7. The method of claim 5, wherein the plurality of requests for content from the plurality of subdomains of advertiser domains are received based on DNS redirection of the subdomains of the advertiser domain.

8. The method of claim 5, further comprising, in response to the plurality of requests, checking the device associated with the user for an Internet cookie associated with each of the plurality of subdomains of advertiser domains.

9. The method of claim 8, further comprising, for each of the plurality of subdomains of advertiser domains, sending the user device either a pixel image or broken image based on a result of checking for the Internet cookie associated with the subdomain of the advertiser domain.

10. The method of claim 1, further comprising:
receiving from the user device a request for a targeted electronic advertisement; and
identifying or generating, based on the data accessed in the Internet cookie, an electronic advertisement targeted to the user device.

11. A system for accessing first party Internet cookies, the system including:
a data storage device storing instructions for accessing first party Internet cookies; and
a processor configured to execute the instructions to perform a method including:
receiving, over an electronic network, a request for an electronic advertisement or an Internet cookie, in response to a user requesting content from a subdomain of an advertiser domain associated with the user viewing a website of an advertiser;
sending, from an ad server associated with an ad network to a device associated with the user, an Internet cookie that is accessible by the ad server and that has the subdomain of the advertiser domain;
receiving, from the device associated with the user, a request for content from a domain of a website of an online publisher, the website of the online publisher including a universal ad call configured to cause a browser of the user to make server calls to a plurality of subdomains associated with cookies set by advertisers, the universal ad call being provided to a plurality of online publishers, one of which is the online publisher;
receiving, from the device associated with the user, upon transmitting the website of the online publisher to the user and based on execution of the universal ad call by the browser of the user, a plurality of server calls to a plurality of subdomains associated with cookies set by advertisers, one of which is the subdomain of the advertiser domain; and
upon identifying, by an ad server receiving the plurality of server calls, that the device associated with the user has stored the Internet cookie having the subdomain of the advertiser domain, accessing data stored in the Internet cookie sent to the device associated with the user.

12. The system of claim 11, wherein the user requests the content from the subdomain of the advertiser domain upon visiting a website of the advertiser domain.

13. The system of claim 11, wherein the website of the advertiser domain contains an ad pixel tag having the subdomain of the advertiser domain.

14. The system of claim 11, wherein the request for the electronic advertisement or Internet cookie is received based on a DNS redirect of the subdomain of the advertiser domain.

15. The system of claim 11, wherein the processor is further configured for:
receiving, from the device associated with the user, a plurality of requests for content from a plurality of subdomains of advertiser domains; and
accessing data stored in the Internet cookie sent to the device associated with the user.

16. The system of claim 15, wherein the plurality of requests for content from the plurality of subdomains of advertiser domains are performed based on the universal ad call being served from a website of the online publisher.

17. The system of claim 15, wherein the plurality of requests for content from the plurality of subdomains of advertiser domains are received based on DNS redirect of the subdomains of the advertiser domain.

18. The system of claim 15, wherein the processor is further configured for, in response to the plurality of requests, checking the device associated with the user for an Internet cookie associated with each of the plurality of subdomains of advertiser domains.

19. The system of claim 18, wherein the processor is further configured to, for each of the plurality of subdomains of advertiser domains, send the user device either a pixel image or broken image based on a result of checking for the Internet cookie associated with the subdomain of the advertiser domain.

20. The system of claim 11, wherein the processor is further configured for:
receiving from the user device a request for a targeted electronic advertisement; and
identifying or generating, based on the data accessed in the Internet cookie, an electronic advertisement targeted to the user device.

21. A computer-implemented method for accessing an Internet browser cookie, the method including:
receiving, from a device associated with a user and over an electronic network, a request for an electronic advertisement, in response to a request for content from a subdomain of a domain associated with the user viewing a website of an advertiser;
sending, from an ad server associated with an ad network to the device associated with the user, an Internet browser cookie that is accessible by the ad server and that has the subdomain of the domain;
receiving, from the device associated with the user, a request for content from a domain of a website of an online publisher, the website of the online publisher including a universal ad call configured to cause a browser of the user to make server calls to a plurality of subdomains associated with cookies set by advertisers, the universal ad call being provided to a plurality of online publishers, one of which is the online publisher;
receiving, from the device associated with the user, upon transmitting the website of the online publisher to the user and based on execution of the universal ad call by the browser of the user, a plurality of server calls to a plurality of subdomains associated with cookies set by advertisers, one of which is the subdomain of the advertiser domain; and
upon identifying, from a pixel tag or image data object, that the device associated with the user has stored the Internet browser cookie having the subdomain of the advertiser domain, accessing, by the ad server, data stored in the Internet browser cookie sent to the device associated with the user.

22. The method of claim 21, wherein the user requests the content from the subdomain of the domain upon visiting a website of an advertiser.

23. The method of claim 21, wherein the website of the advertiser contains an ad pixel tag served from the subdomain of the domain.

24. The method of claim 21, wherein the request for the electronic advertisement is received based on a DNS redirect of the subdomain of the domain.

25. A system for accessing first party Internet cookies, the system including:
- a data storage device storing instructions for accessing first party Internet cookies; and
- a processor configured to execute the instructions to perform a method including:
  - receiving, over an electronic network, a request for an electronic advertisement or an Internet cookie, in response to a user requesting content from a first domain associated with the user viewing a website of an advertiser;
  - sending, from an ad server associated with an ad network to a device associated with the user, an Internet cookie that is accessible by the ad server and that has the first domain;
  - receiving, from the device associated with the user, a request for content from a second domain associated with a website of an online publisher that includes a universal ad call configured to cause a browser of the user to make server calls to a plurality of subdomains associated with cookies set by advertisers, the universal ad call being provided to a plurality of online publishers, one of which is the online publisher;
  - receiving, from the device associated with the user, upon transmitting the website of the online publisher to the user and based on execution of the universal ad call by the browser, a plurality of server calls to a plurality of subdomains associated with cookies set by advertisers, one of which is the subdomain of the first domain; and
  - upon identifying that the device associated with the user has stored the Internet cookie having the subdomain of the first domain, accessing data stored in the Internet cookie sent to the device associated with the user.

26. The system of claim 25, wherein the user requests the content from the first domain upon visiting a website of an advertiser, wherein the website of the advertiser is hosted at a third domain, and the first domain includes or incorporates a subdomain.

27. The system of claim 26, wherein the website of the advertiser contains an ad pixel tag served from the first domain.

28. The system of claim 26, wherein the request for the electronic advertisement or Internet cookie is received based on a DNS redirect of the first domain.

* * * * *